United States Patent [19]

Weaver

[11] 4,347,638

[45] Sep. 7, 1982

[54] RETRACTABLE PORCH AND STAIR APPARATUS FOR TRAILERS

[76] Inventor: Murland L. Weaver, 748 N. 900 West, Apt. 104, Salt Lake City, Utah 84116

[21] Appl. No.: 128,380

[22] Filed: Mar. 10, 1980

[51] Int. Cl.³ .............................................. E01D 1/00
[52] U.S. Cl. ........................................ 14/71.1; 52/69; 182/88; 182/115
[58] Field of Search ............... 14/71.1, 69.5; 280/166; 52/67, 69, 183; 182/88, 84, 115; 296/162

[56] References Cited

U.S. PATENT DOCUMENTS

| | | | |
|---|---|---|---|
| 2,457,380 | 12/1948 | Kelberer | 14/69.5 X |
| 2,786,710 | 3/1957 | Chapman | 52/69 X |
| 2,929,654 | 3/1960 | Jones | 296/162 |
| 3,515,406 | 6/1970 | Endsley | 280/166 |
| 3,693,754 | 9/1972 | Butler | 182/115 X |
| 3,796,456 | 3/1974 | Bergeson | 182/88 X |
| 3,808,757 | 5/1974 | Greenwood | 182/115 X |
| 3,906,690 | 9/1975 | Miriani | 182/88 X |
| 3,912,298 | 10/1975 | Humphrey | 182/115 X |
| 4,078,678 | 3/1978 | Tordella | 14/69.5 X |
| 4,139,078 | 2/1979 | Keller | 182/88 |

Primary Examiner—Nile C. Byers, Jr.
Attorney, Agent, or Firm—K. S. Cornaby

[57] ABSTRACT

A retractable porch and stair apparatus suitable for use with trailers and the like has a pair of parallel elongate channel members for attachment to the underside of a trailer. A floor member having preferably iron grating therein for strength and cleanliness is disposed on a pair of parallel runner members slidingly mounted on the channel members so that the floor member can be slidingly moved from the underside of the trailer to a position adjacent thereto. A stair combination having parallel side support members in the form of channel members is connected at one end to a corresponding pair of second channel members mounted on the underside of the floor member and extending to the side of the floor member so that the stair combination can be raised to horizontal position and slidingly moved underneath the floor member, and the floor member and stair members can then be slidingly moved under the trailer for storage.

6 Claims, 5 Drawing Figures

RETRACTABLE PORCH AND STAIR APPARATUS FOR TRAILERS

BACKGROUND OF THE INVENTION

This invention relates to retractable stair and porch assemblies for trailers and the like.

There has been a long-recognized need for portable or retractable stairs, ladders and porch combinations to accommodate the entry and exit from vehicles having a rather high floor, such as campers, mobile homes, vans, house trailers and the like. The prior art illustrates a number of attempts to meet these needs with specific structures adapted for use with different structural needs of campers, trailers and mobile homes. For example, the following U.S. Pat. Nos. 2,929,654; 2,786,710; and 3,515,406 demonstrate solutions to the problems connected with house trailers, campers and the like. U.S. Pat. No. 4,139,078 relates to a simple ladder assembly for use with a truck to unload or load from the rear.

However, there is an increasing demand for a stair and porch combination to use with semi-trailers which have been converted to on-site construction offices. Many construction projects are located in remote areas and do not have access to permanent office facilities or structures. In these instances, it has been found necessary to haul a large semi-trailer into the area and outfit it with a door, windows and office furnishings. Since the trailer floor is a considerable distance from the ground, stair and porch means must be provided for convenient access. Moreover, when the trailer must be moved to a new location, it is desirable to be able to easily move the stair and porch combination with the trailer.

Those ladders, porches and stairs disclosed in the prior art do not solve the specific problem of the construction trailer, and resort has been had, of necessity to a wooden porch and step combination that is simply placed adjacent to the trailer door. When the trailer is moved, the wooden structure cannot either be dismantled, or hauled in another vehicle to the new site.

It is therefore an object of this invention to provide a retractable porch and stair apparatus which can be permanently attached to the trailer at the door, and can be retracted under the trailer for traveling with a minimum of lost time and effort.

BRIEF SUMMARY OF THE INVENTION

According to the invention, a combination retractable porch and stair apparatus for large trailers is provided, which has in combination a floor or porch means mounted on a pair of elongate channel iron members which are slidingly mounted on a cooperating pair of elongate channel iron members adapted for attachment to the underside of a trailer adjacent to the trailer door at right angles thereto. Extending downwardly at an angle from one lateral side of the floor means is a pair of side support members having stair members therebetween at appropriate intervals. The side support members are slidingly connected at their upper ends to a cooperating pair of channel iron members mounted under the porch means and adapted to slidingly receive the side support members on slide means mounted on the sides of the side support members. In accordance with the invention, the stair assembly can be slidingly disposed under the porch means and then both porch and stair combination can be slidingly disposed underneath the trailer for storage or travel.

THE DRAWINGS

A preferred embodiment of the invention is shown in the attached drawings, in which:

FIG. 1 is a perspective view of the porch and stair combination in place on a trailer;

FIG. 2, an enlarged detail showing the securing means for the side support member of the stair assembly with the floor;

FIG. 3, a side elevational view of the porch and stair combination taken along line 3—3 of FIG. 1, showing the stair assembly under the floor in dotted-line;

FIG. 4, a rear elevational view, showing the arrangement of the apparatus as mounted on a trailer taken along line 4—4 of FIG. 1; and FIG. 5, an end elevational view of a clamp used to secure the two channel-iron members with the porch in the external position.

DETAILED DESCRIPTION OF THE DRAWINGS

Figure 1:
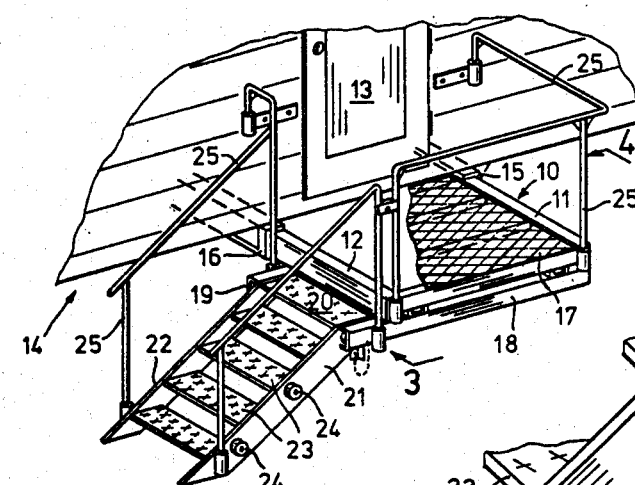
Figure 3:
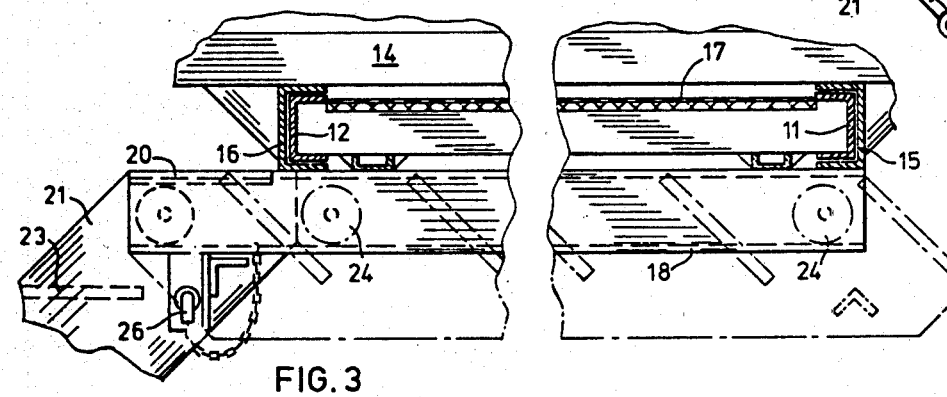
Figure 4:
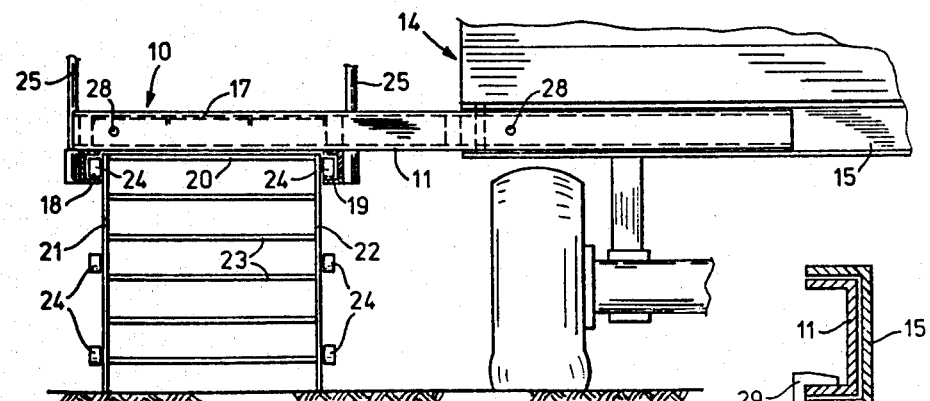

As illustrated in FIGS. 1, 3 and 4, a preferred embodiment of the porch and stair apparatus of the invention has a porch assembly 10 comprising a pair of elongate, spaced-apart channel iron support members 11, 12 disposed in parallel relationship to each other extending outwardly from the side doorway 13 of a semi-trailer 14. Support members 11, 12 are slidingly mounted at respective ends in a cooperating second pair of spaced-apart, elongate channel iron support members 15, 16 permanently mounted on the underside of trailer 14. It is essential that first support members 11, 12 be of sufficient length that when they are extended beyond the trailer 14, they still extend into first support members 15, 16 to provide leveraged support, since there is no external support means under the extended ends of the second support members 11, 12.

The upper surface of first support members 11, 12 is covered with a floor 17, which in this embodiment preferably comprises a plurality of iron mesh screens mounted on the support members. Such screens provide not only rigidity and support, but also ease of cleaning mud and dirt from users' shoes before entering the trailer.

A third pair of elongate spaced-apart channel iron support members 18, 19 are mounted perpendicularly of, and on the underside of, the first pair of support members 11, 12. The respective ends of third support members 18, 19 extend beyond the lateral edge of floor 17 to provide a first step 20. Extending downwardly at an obtuse angle to the ground level is a pair of elongate, spaced-apart stair support members 21, 22 adapted to fit between third support members 18, 19. Stair support members 21, 22 have a plurality of steps 23 disposed between the members 21, 22.

Stair support members 21, 22 are provided with a plurality of spaced-apart slide means, which in this embodiment comprise a series of spaced-apart roller members 24 for engaging and slidingly moving along third channel iron support members 21, 22. When it is desired to store the porch and stair apparatus, the stair side members 21, 22 are lifted to the horizontal position and pushed along roller members 24 into channel iron support members 18, 19 until the stairs 23 are secured under floor 17.

Figure 2:
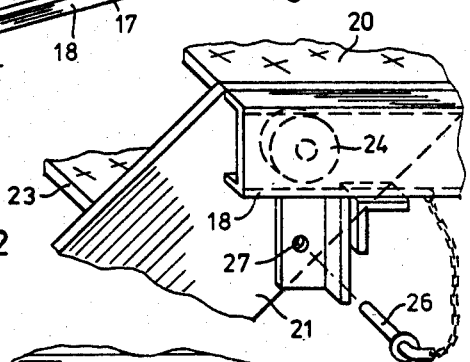

For security, a series of removable railing members 25 are provided, which can be secured to the porch and stair apparatus, as well as to the wall of trailer 14. Also for security purposes, a locking bar 26 is provided, as shown in detail in FIG. 2, so that bar 26 can be inserted in aperture 27 to secure the stairs in place. As seen in FIG. 4, additional apertures 28 and pins (not shown) can be provided along channel iron members 15, 16 to secure channel iron members 11, 12 in place both when extended and when under the trailer 14 for storage.

Figure 5:
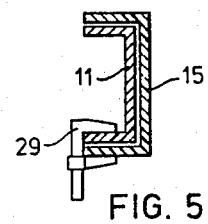

FIG. 5 illustrates another safety feature and is a modified C-clamp 29 attached to channel iron support members 11, 15 and 12, 16 under trailer 14 to prevent sliding movement of the support members when extended for use.

While this invention has been herein described with reference to preferred embodiments, it is understood that substantial equivalents can be used as understood by those skilled in the art as defined by the scope of the appended claims.

I claim:

1. A combination retractable porch and stair apparatus for trailers, comprising in combination;
   floor means mounted on a pair of elongate spaced-apart channel iron support members;
   a second pair of cooperating elongate, spaced-apart channel iron support members slidingly receiving said first pair of support members, said second pair of support members being adapted for attachment on the underside of a trailer;
   a third pair of spaced-apart, elongate channel iron support members mounted on the underside of said second pair of support members perpendicularly of said first pair of support members; and
   stair means having a pair of spaced-apart elongate stair side support members slidingly mounted on said third pair of support members.

2. An apparatus as set forth in claim 1, wherein said pair of stair side support members are slidingly mounted on said third pair of channel iron support members with a plurality of roller means mounted on said pair of side support members for engagement with said pair of channel iron support members.

3. An apparatus as set forth in claim 1, including securing means for securing said stair means in place in the downward position with said floor means.

4. An apparatus as set forth in claim 1, including locking means for securing said floor means in the extended position with respect to said 5. An apparatus as set forth in claim 4, wherein said locking means comprises a "C"-clamp for disposition around each respective pair of cooperating first and second pairs of channel iron support members.

6. An apparatus as set forth in claim 1, including removable railing means for security around said floor means and aong said stair means.

* * * * *